(12) United States Patent
Fujii et al.

(10) Patent No.: US 6,370,463 B1
(45) Date of Patent: Apr. 9, 2002

(54) STRATEGY FOR CONTROLLING RATIO CHANGES IN A SWAP-SHIFT AUTOMATIC TRANSMISSION

(75) Inventors: Yuji Fujii, Ann Arbor; William Emil Tobler, Willis; Ted Duane Snyder, Brighton; Marvin Paul Kraska, Dearborn, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,931

(22) Filed: Nov. 1, 2001

(51) Int. Cl.[7] ............................................... F16H 61/04
(52) U.S. Cl. ............................... 701/51; 701/66; 701/55
(58) Field of Search ............................... 701/51, 55, 56, 701/60, 61, 66; 475/43, 276; 477/155

(56) References Cited

U.S. PATENT DOCUMENTS

| 4,918,606 | A | * | 4/1990 | Ito et al. ........................ 701/51 |
| 5,157,608 | A | | 10/1992 | Sankpal et al. |
| 5,272,630 | A | | 12/1993 | Brown et al. |
| 5,334,117 | A | * | 8/1994 | Ito ............................... 475/276 |
| 5,758,302 | A | | 5/1998 | Schulz et al. |
| 5,809,442 | A | | 9/1998 | Schulz et al. |
| 5,835,875 | A | | 11/1998 | Kirchhoffer et al. |
| 6,186,924 | B1 | * | 2/2001 | Ohtsuka ....................... 701/66 |

* cited by examiner

Primary Examiner—Richard M. Camby
(74) Attorney, Agent, or Firm—Frank G. McKenzie (57) ABSTRACT

A method for controlling ratio changes in a swap-shift transmission having a first simple planetary gear unit and a second compound planetary gear unit, the two gear units being arranged in series disposition, pressure-operated friction elements for separately braking the reaction member at each of the gear units to establish a change in ratio. The change in ratio consists of a downshift by releasing a reaction friction element for the first gear unit and upshifting the second gear unit by applying a second friction element to anchor a reaction member of the second gear unit in a non-synchronous fashion to achieve a consistent shift quality without precise matching of friction element application and release whereby inertia torque disturbances in the torque output elements of the transmission are avoided.

11 Claims, 10 Drawing Sheets

STRATEGY FOR CONTROLLING RATIO CHANGES IN A SWAP-SHIFT AUTOMATIC TRANSMISSION

BACKGROUND OF INVENTION

1. Field of the Invention

The invention relates to a control method for establishing smooth ratio changes in a multiple-ratio geared transmission for an automotive vehicle wherein the gearing elements of the transmission are characterized by a swap-shift.

2. Background Art

A conventional multiple-ratio automatic transmission for automotive vehicles includes multiple-ratio gearing having gear elements that are controlled by pressure-operated friction clutches and brakes, which are applied and released to effect ratio changes. The multiple-ratio gearing may comprise two planetary gear units, which define plural torque flow paths arranged in series disposition. One such transmission is disclosed in U.S. Pat. No. 5,835,875, which is assigned to the assignee of the present invention.

The transmission of the '875 patent comprises two planetary gear units that can be upshifted or downshifted independently, one with respect to the other, to effect gear ratio changes. The upshifting and the downshifting of the planetary gear units occur simultaneously to accomplish an overall gear ratio upshift or downshift. This involves downshifting the first planetary gear unit by releasing an overdrive brake for a reaction element of the first planetary gear unit while simultaneously upshifting the second planetary gear unit, which has multiple ratios, by applying a brake for a reaction element of the multiple-ratio planetary gear unit. This is commonly referred to as a swap-shift.

In the control system for the '875 patent, the release of the reaction brake for the first planetary gear unit and the application of the reaction brake for the second planetary gear unit must be accomplished synchronously. Even if a small error in the synchronization is present, the shift quality may be accompanied by a large shift shock due to inertia torque disturbances.

Swap-shift transmissions of the kind shown in the '875 patent require precise matching of friction element application and release in order to maintain consistent shift quality. This objective is difficult to achieve, however, under all operating conditions over the life of the automotive vehicle powertrain. This is due in part to the typical changes in the braking characteristics of the friction elements as well as operating variables in the control system for the friction elements. Manufacturing tolerances for the powertrain hardware also contribute to inconsistent shift quality, as does limited data communication speed for electronic digital microcomputer components typically used for controlling the vehicle powertrain.

Swap-shift transmissions of the kind disclosed in the '875 patent rely upon precise control of the friction elements to synchronize the behavior of two separate planetary gear units to obtain consistent shift quality. It requires an overdrive friction brake capacity reduction for the first gear unit and an intermediate ratio friction brake application for the second gear unit. The application and release of the brakes are initiated simultaneously at the beginning of the shift interval. The overdrive brake drum speed increases while the intermediate ratio brake drum speed decreases. When the intermediate brake completes its engagement, the overdrive brake capacity is synchronously brought to zero. A small output torque peak may occur as a result of the inertia torque developed during the torque transfer from the overdrive brake to an overrunning coupling in the overdrive gear unit. Shift quality becomes very sensitive to a small mismatch in timing of the overdrive brake release and the intermediate brake engagement.

In a conventional swap-shift transmission, an early release of the overdrive brake causes a sudden and large torque transfer from the overdrive brake to the overrunning coupling while the intermediate brake is still rotating. This leads to a sudden increase of input torque into the second planetary unit. As a result, intermediate brake torque capacity is substantially increased before the intermediate brake drum motion completely stops in order to complete its engagement in time. A combination of a torque transfer from the overdrive brake to the overrunning coupling and an increase in intermediate brake torque capacity results in a large output torque spike if brake application and release are not precisely timed.

A large output torque spike is perceived by the driver as a shift shock. Further, if the intermediate brake completes its engagement before the overdrive brake is fully released, a low torque capacity developed at the overdrive brake results in a sharp output torque decrease. This also is perceived by the driver as a shift shock.

SUMMARY OF INVENTION

The invention is a robust control method comprising a strategy to achieve consistent shift quality in a swap-shift automatic transmission of the kind disclosed in the '875 patent. Unlike prior art control systems, the strategy of the present invention does not require precise matching of the friction element application and friction element release timing to avoid a perceptible shift shock.

The method of the invention comprises measuring the carrier speed of a first planetary gear unit, which includes an overrunning coupling for effecting a direct-drive state and a pressure-actuated reaction brake for effecting an overdrive state. The speed of the carrier of a second planetary gear unit and the speed of the sun gear for the second planetary gear unit also are measured. The overrunning speed of the overrunning coupling is controlled during a shift interval so that the reaction torque on the sun gear of the first gear unit becomes zero in a first time increment.

The speed of the sun gear of the second gear unit also is measured during a second time increment so that a second pressure-actuated reaction brake for the second gear unit becomes fully applied before the first reaction brake is fully released.

The overrunning coupling speed control provides partial torque transfer from the reaction brake for the first gear unit to the overrunning coupling before the reaction brake for the second gear unit reaches a low target speed approaching zero speed.

The control routine for the overrunning speed of the overrunning coupling occurs simultaneously with the control routine of the sun gear speed for the second gear unit. Each control routine is achieved in a closed loop fashion using actuating pressure as a variable in the control of the pressure-actuated reaction brake for the respective gear units.

BRIEF DESCRIPTION OF DRAWINGS

FIG. 1b is a chart showing the condition of the friction elements and the overrunning couplings for each of the two ratio steps of FIGS. 1 and 1a;

DETAILED DESCRIPTION

1. General Description of Powertrain

Figure 1:
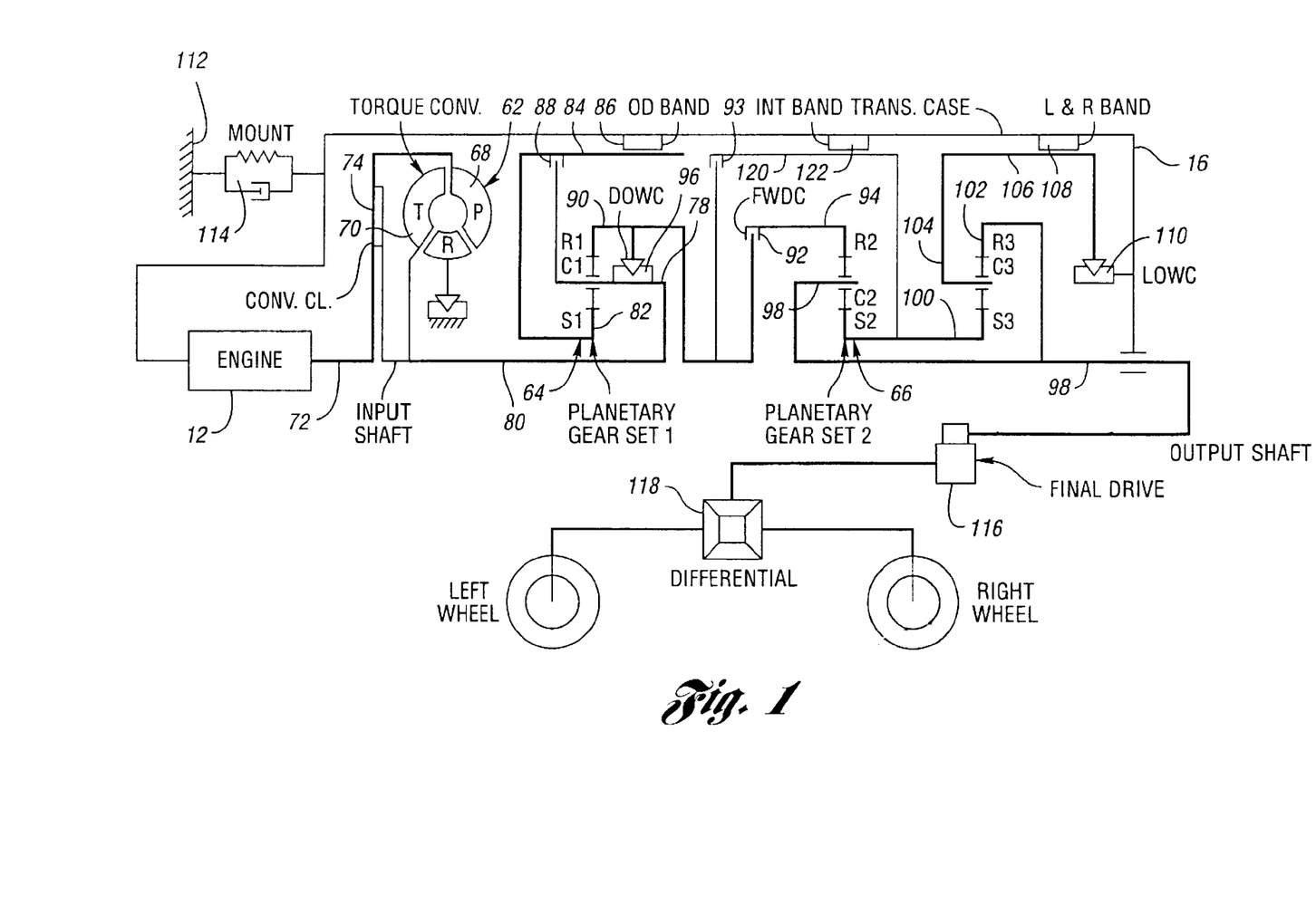
FIG. 1 is a schematic representation of a swap-shift transmission having a first simple planetary gear unit and a second compound planetary gear unit arranged for second speed ratio operation in a torque flow path extending from an engine to a torque output shaft.
Figure 1A:
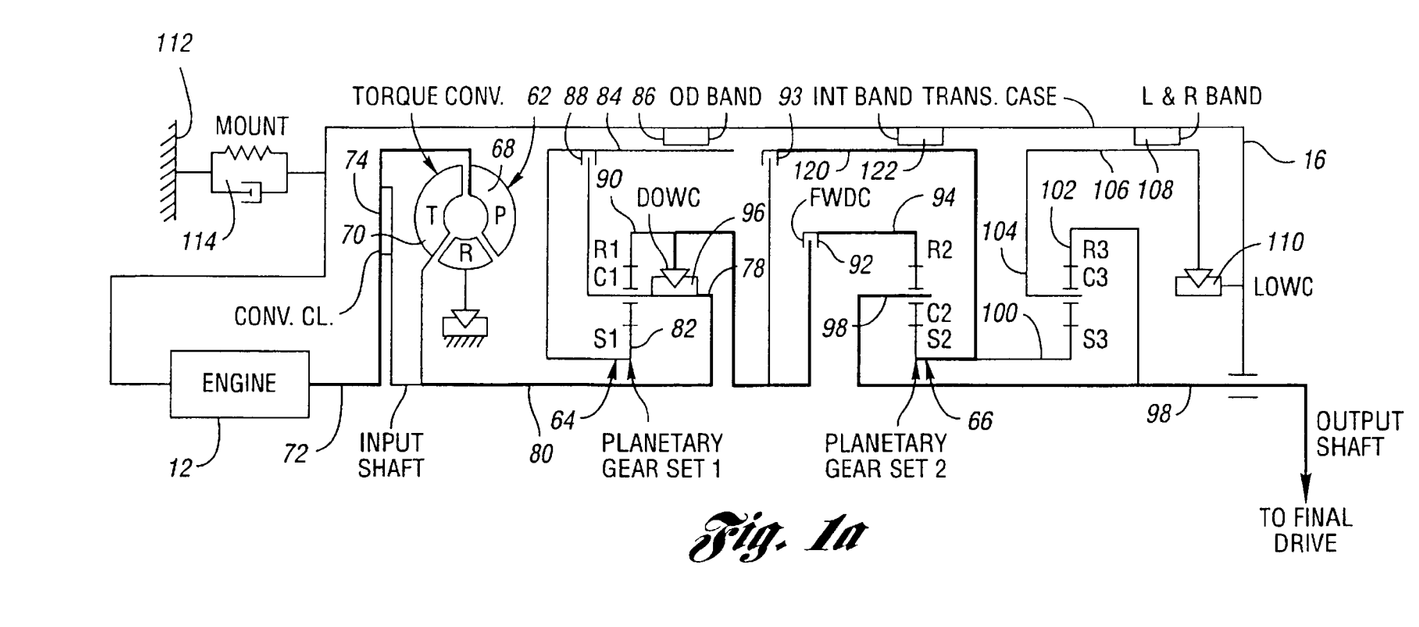
FIG. 1a is a schematic representation of the transmission of FIG. 1 when it is adapted for third speed ratio operation.

FIG. 1 shows a swap-shift transmission of the kind shown in the previously described '875 patent when the gearing elements are conditioned for second speed ratio operation. FIG. 1a shows the transmission of FIG. 1 when it is adapted for third speed ratio operation. The transmission forms a part of the powertrain system illustrated in FIG. 1c.

Figure 1B:
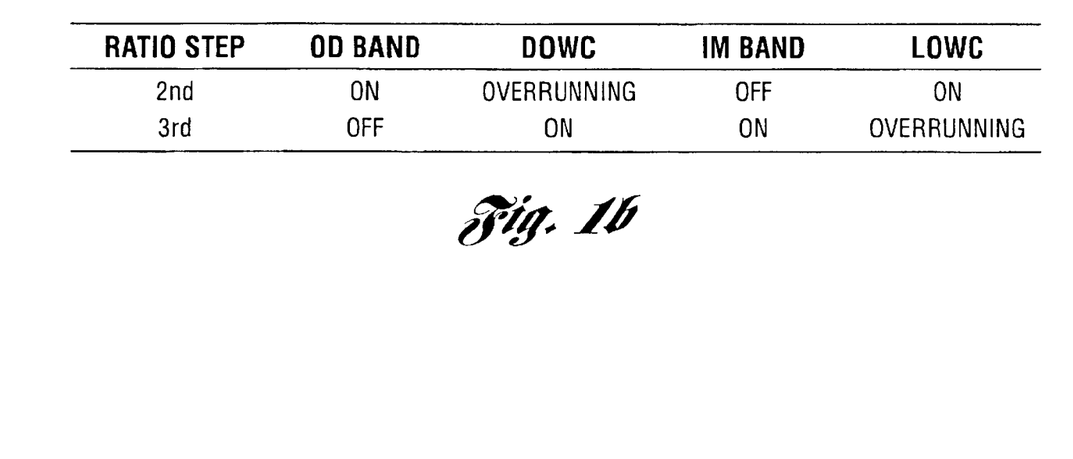
Figure 1C:
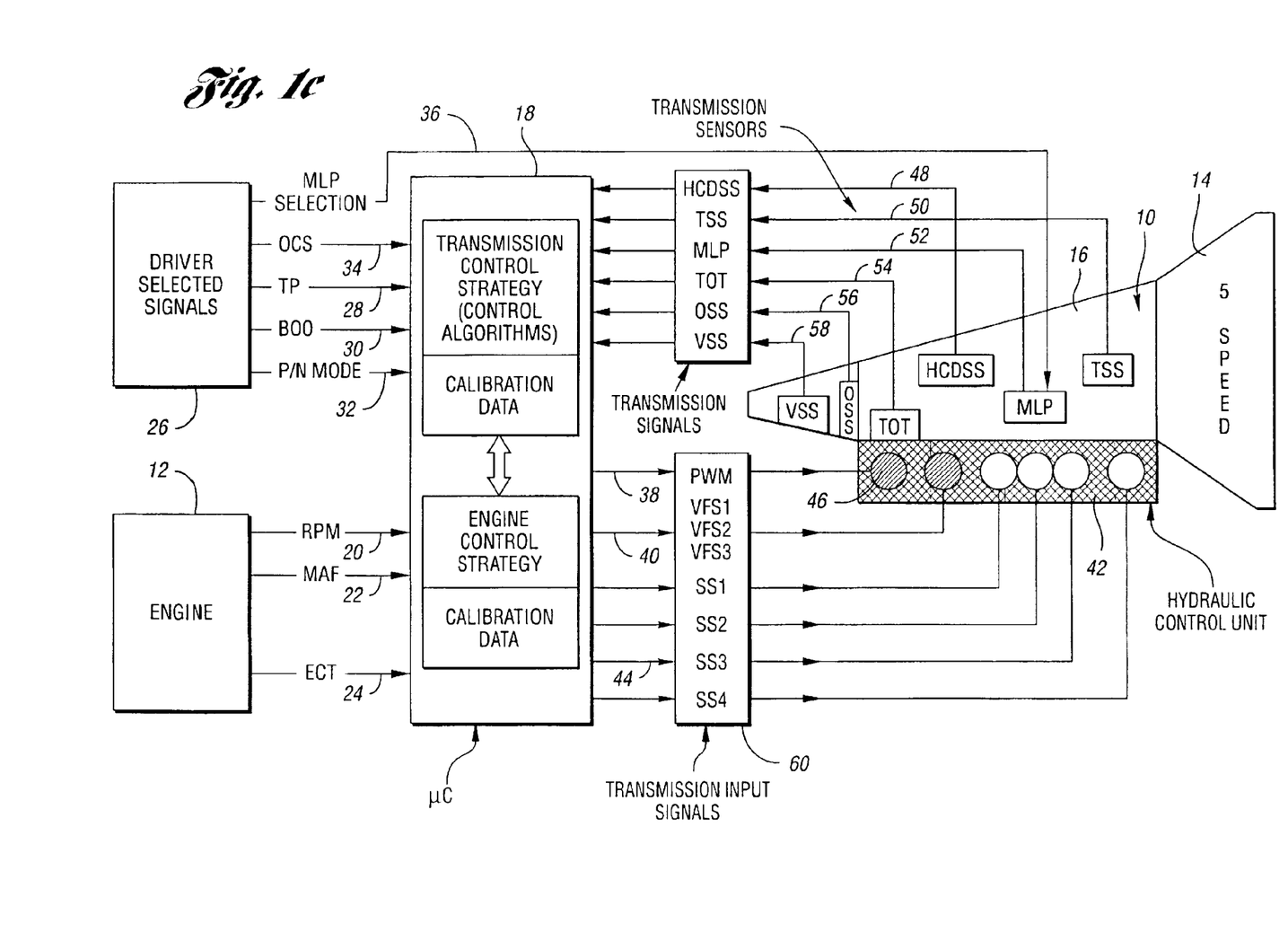
FIG. 1c is an overall system block diagram of a vehicle powertrain including an engine, a transmission and a digital microcomputer powertrain controller for effecting application and release of pressure actuators for friction elements of the transmission.

In FIG. 1c, the transmission is schematically shown at 10. The engine is shown at 12. Engine crankshaft torque is distributed through the impeller of a torque converter located in converter housing 14, which forms a part of the transmission case 16. An integrated engine and transmission electronic powertrain control comprises digital microcomputer 18 having memory registers for transmission control strategy and engine control strategy. The engine supplies engine speed input signals at 20, manifold pressure signals at 22, and engine coolant temperature signals at 24, which are received by input signal conditioning ports of the microcomputer 18. Driver selected signals illustrated at control block 26 include a throttle position signal 28, a brake on-off signal 30, a park/neutral mode signal 32, an overdrive cancel switch signal 34, and a manual lever position selection signal 36. Both sets of signals are distributed to input signal conditioning ports for the microcomputer 18.

The microcomputer 18 executes control strategy that results in a pulse width modulated pressure signal 38 for circuit pressure regulator 46. Various variable-force solenoid signals 40 as well as shift solenoid signals 44 may be transferred to hydraulic control unit 42 for controlling shift valves and to effect pressure modification to achieve shift timing. The characteristics of the hydraulic control unit in the control of the transmission 10 are described in the previously mentioned '875 patent. The disclosure of that patent is incorporated herein by reference.

A high clutch drum speed signal is distributed to the microcomputer 18, as shown at 48. A turbine speed sensor signal is distributed from the transmission 10 through signal flow path 50. A manual lever position signal indicating actual manual lever position selected by the driver is distributed to the microcomputer 18 through signal flow path 52. A transmission oil temperature signal is distributed to the microcomputer 18 through signal flow path 54. An output shaft speed signal is distributed from sensor VSS to the microcomputer through signal flow path 56. A vehicle speed sensor signal is distributed to the microcomputer 18 through signal flow path 58.

The input signals for the transmission 10 control transmission actuators, which are illustrated in block diagram form in FIG. 1c at 60.

In FIG. 1, the transmission case 16 encloses the hydrokinetic torque converter 62 and two planetary gear units 64 and 66. Gear unit 64 is a simple planetary overdrive gear unit, and gear unit 66 is a compound planetary gear unit commonly referred to as a Simpson gearset.

Impeller (or pump) 68 is connected at 72 to the crankshaft of engine 12. A torque converter lockup clutch 74 selectively connects the impeller 68 to turbine 70. Turbine torque is distributed to the carrier 78 of gear unit 64 through a turbine shaft 80. Sun gear 82 of gear unit 64 is connected to overdrive brake drum 84, which is surrounded by selectively engageable, pressure-actuated brake 86. A coast clutch 88 connects the carrier to the brake drum 84 when coast braking is desired.

Ring gear 90 is connected through friction clutch 92 to ring gear 94 of planetary gear unit 66 during fourth and fifth ratio operation. For purposes of the present dynamic analysis, however, this is not relevant to a swap-shift.

An overrunning coupling 96 (DOWC) connects the carrier 78 when the gear unit 64 is in a direct-drive mode. When the brake 86 anchors brake drum 84 and the sun gear 82, the overrunning coupling 96 freewheels as the gear unit 64 enters an overrunning mode. The carrier 98 for gear unit 66 is connected directly to torque output shaft 98.

The sun gear 100 for gear unit 66 is common to each of two gear units of the planetary gear unit 66. The ring gear for the first gearset, as previously described, is identified by reference numeral 94. The ring gear for the second gearset is identified by reference numeral 102. The carrier for the second gearset, shown at 104, is connected to low-and-reverse brake drum 106, which is surrounded by band brake 108. Brake 108 is applied during reverse drive operation and during manual low operation. It is capable of accommodating torque in the reverse direction as well as coasting torque during coasting operation in the low ratio.

During forward-drive operation in the lowest ratio, brake drum 106 is anchored by overrunning coupling (clutch) 110.

The transmission case and the engine 12 are mounted on the vehicle chassis, as shown at 112, through an engine mount system 114.

The torque output shaft 98 is connected to the torque input gear of a final drive gear assembly 116, which in turn distributes torque to a differential-and-axle assembly, generally indicated at 118. The left traction wheel and the right traction wheel receive torque from the differential side gears through axle half shafts as shown.

The common sun gear 100 is connected to intermediate brake drum 120, which is surrounded by intermediate brake 122.

The schematic diagram of FIG. 1 shows a torque flow path for the transmission when the transmission is in condition for second speed ratio operation. The elements that transmit torque are illustrated by heavy lines. The elements that do not transmit torque are illustrated by light lines.

FIG. 1*b* indicates the brakes and clutches that are engaged or released to establish the second forward-driving ratio. When the transmission is in condition for second speed ratio operation, the overdrive brake 86 is applied, the overrunning coupling 96 (DOWC) is overrunning, the intermediate brake 122 (IM BAND) is released, and the low overrunning coupling 110 (LOWC) is engaged. Turbine torque is distributed to the carrier 78 of the first planetary gear unit 64.

During second ratio operation, the gear unit 64 is upshifted since brake 86 is applied. Torque of ring gear 90 is distributed through the forward-drive clutch 92 to the ring gear 94.

The forward-drive clutch 92 is continuously engaged during operation in each of the forward-driving ratios. For purposes of the present dynamic analysis dealing with the swap-shift strategy of the present invention, it can be assumed that there is a direct connection between ring gear 94 and ring gear 90.

During operation in the first ratio, reaction torque for the second gear unit 66, a Simpson planetary gear unit is accommodated by the overrunning coupling 110. When the transmission is in condition for second speed ratio operation, the brake 86 is applied and brake 122 continues to be released. This causes the gear unit 64 to shift to an overdrive state as the reaction torque for the second gear unit continues to be accommodated by the overrunning coupling 110.

A shift to the third ratio is obtained by releasing brake 86 and applying brake 122. The planetary gear unit 64 thus is downshifted to a direct-drive ratio as the second planetary gear unit is upshifted with the sun gear 100 acting as a reaction element since it is anchored by the brake 122.

Fourth ratio operation is achieved by engaging clutch 93, thereby causing the second planetary gear unit to assume a one-to-one drive ratio mode as torque is transmitted through the overrunning coupling 96 (DOWC) in the first gear unit.

Fifth ratio operation is achieved when clutch 93 is engaged, which causes the second gear unit to assume a one-to-one drive ratio as the first planetary gear unit assumes an overrunning state as the sun gear 82 is anchored by brake 86.

A ratio change from a second ratio to the third ratio is a swap-shift. As indicated in FIG. 1*b*, this is accomplished by releasing brake 86 causing the overrunning coupling 96 to be engaged. Further, the intermediate brake 122 becomes applied as the overrunning coupling 110 (LOWC) begins to overrun.

FIG. 1*a* illustrates the torque delivery elements of FIG. 1 when the transmission is conditioned for third ratio operation. As in the case of FIG. 1, the elements that deliver torque are illustrated in heavy lines. The elements that do not deliver torque are illustrated in light lines. The first planetary gear unit 64 is downshifted in the case of FIG. 1*a* by releasing overdrive brake 86 while the second planetary gear unit 66 is operating in its intermediate ratio by applying intermediate speed ratio brake 122. The overrunning coupling 96 now delivers torque as the first gear unit 64 assumes a one-to-one driving ratio. Further, sun gear 66 becomes a reaction element. As turbine torque is delivered through the first planetary gear unit to the ring gear 94, carrier 98 becomes a torque output element as the overrunning coupling 110 freewheels.

2. General Description of Conventional Swap-Shift Controls

For the purpose of clarifying the differences between applicants' invention and a conventional swap-shift control system, the plots of FIGS. 2, 3 and 4 first will be described. The performance demonstrated by FIGS. 2, 3 and 4 then will be compared to the performance of a swap-shift control system embodying the strategy of the invention.

Figure 2:
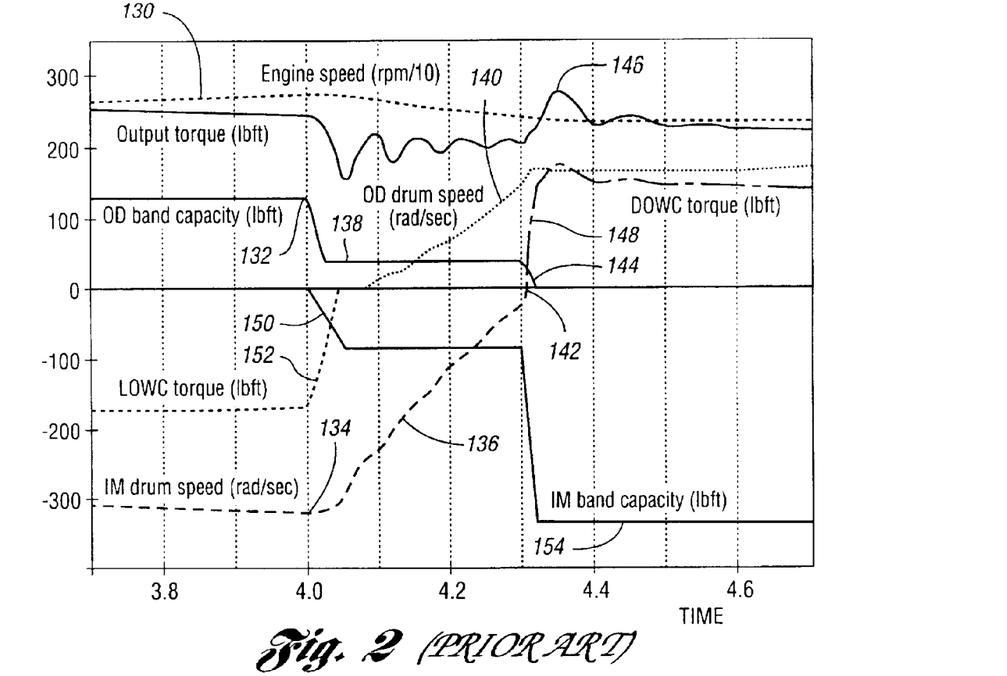
FIG. 2 is a plot of the brake and coupling capacity and gear element speeds during a synchronized shift for a conventional swap-shift transmission of the kind shown in the '875 patent.

In the plot of FIG. 2, the characteristics of a conventional swap-shift from the second ratio to the third ratio at low engine throttle is indicated. FIG. 2 represents speed, torque and brake capacity variations during a shift interval, shift interval time being plotted along the abscissa. Engine speed, shown at 130, remains relatively uniform throughout the shift interval. In the example plotted in FIG. 2, the engine speed is approximately 2500 rpm. At the beginning of a shift interval, the overdrive brake capacity begins to decrease at point 132 and the intermediate brake becomes applied at point 134. The intermediate drum speed then falls, as shown at 136, as the overdrive brake capacity falls to a lower value as shown at 138, where the overdrive brake drum begins to slip. The release of the overdrive brake and the application of the intermediate brake occur simultaneously. In the example of FIG. 2, this occurrence is at 4.0 seconds, which is also point 134 for the intermediate brake.

When the overdrive brake capacity decreases to the value shown at 138, the overdrive drum speed increases, as shown at 140. This occurs simultaneously with a decrease in the intermediate brake drum speed, as shown at 136. In the example shown in FIG. 2, the intermediate brake completes its engagement at 4.3 seconds, as shown at 142. Simultaneously, the overdrive brake capacity drops to zero, as shown at 144.

Although the zero points for the intermediate brake drum speed and the overdrive brake capacity nearly coincide, a small undesirable, but acceptable, output torque peak is developed at 146, which is the result of inertia torque disturbance due to the transfer of torque from the overdrive brake to the coupling DOWC. This torque transfer is shown at 148.

As the intermediate brake capacity rises at the beginning of the shift at 4.0 seconds, as shown at 150, the torque on the overrunning coupling LOWC decreases as shown at 152. At the completion of the shift at approximately 4.3 seconds, the intermediate brake capacity rises to its maximum level, as shown at 154, as the torque transfer to the overrunning coupling DOWC is completed.

Figure 3:
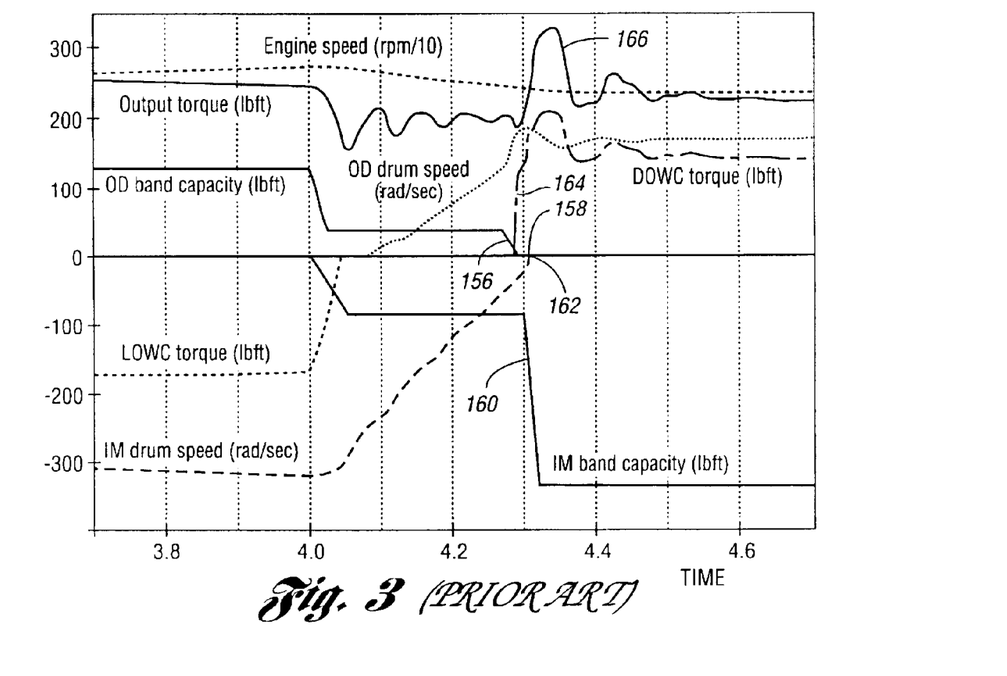
FIG. 3 is a plot corresponding to FIG. 2 which shows the brake capacity and gear element speeds during a ratio upshift of a conventional transmission of the kind shown in the '875 patent when the overdrive brake is released early rather than synchronously as in the case of FIG. 2.
Figure 4:
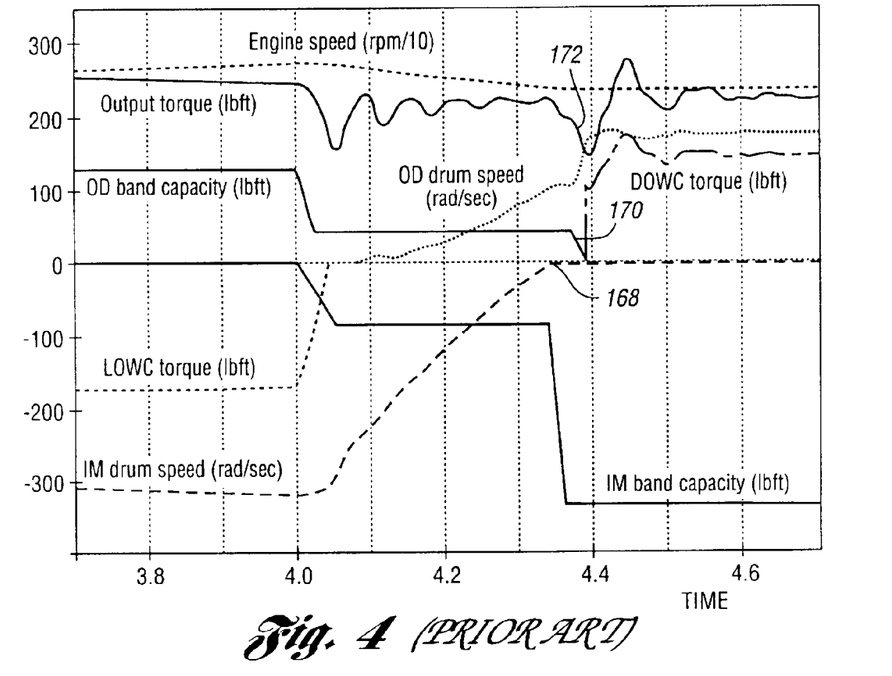
FIG. 4 is a plot corresponding to FIGS. 2 and 3 wherein the overdrive brake is released late relative to the synchronized release of the overdrive brake of FIG. 2.

If there is a mismatch in the overdrive brake release and the intermediate brake engagement timings, the shift quality deteriorates substantially, as shown in FIGS. 3 and 4. In the case of FIG. 3, the overdrive brake is released early, and in the case of FIG. 4, the overdrive brake is released late.

FIG. 3 shows that the final release of the overdrive brake is commanded at 156 before the intermediate brake engagement is complete at 158. As a result of this mismatch, an input torque to the intermediate brake drum increases, which changes the intermediate brake drum dynamics. The intermediate brake torque capacity is increased to a holding level as shown at 160 just before the intermediate brake drum motion completely stops at 162. This combination of torque transfer from the overdrive brake to the overrunning coupling DOWC, as shown at 164, and an increased intermediate brake torque capacity at 160 results in a large output shaft torque spike, as shown at 166. This causes a perceptible shift shock. Unlike the torque peak at 146 in FIG. 2, the torque peak at 166 in FIG. 3 is not acceptable.

In FIG. 4, the intermediate brake completes its engagement at 168 before the overdrive brake is released at 170. The torque transmitted through the overdrive brake between 4.34 seconds and 4.39 seconds results in an output torque hole, as shown at 172. This torque hole or depression in the output torque plot is perceived by the vehicle operator as a shift shock.

It is apparent from FIGS. 3 and 4 that slight deviations in the overdrive brake release timing and the intermediate brake drum apply timing cause sharp variations in the output shaft torque because of the high sensitivity in the timing of the friction engagements and release. Consistent shift quality is difficult to achieve with a conventional strategy. A minor variation in the completion of the application of the intermediate brake drum and the release of the overdrive brake, approximately 30 ms in the case of FIGS. 3 and 4, will cause a substantial inertia effect in the output shaft torque.

3. Description of Strategy of Invention

FIGS. 5, 6 and 7a–7d illustrate an improvement in the shift performance compared to the performance indicated in FIGS. 2, 3 and 4. The performance indicated in FIGS. 5, 6 and 7a–7d is the result of a robust control that achieves consistent shift quality. Unlike the performance indicated in FIGS. 2, 3 and 4, the strategy of the present invention does not require precise matching of the friction element application and release to avoid a perceptible shift shock.

Figure 5:
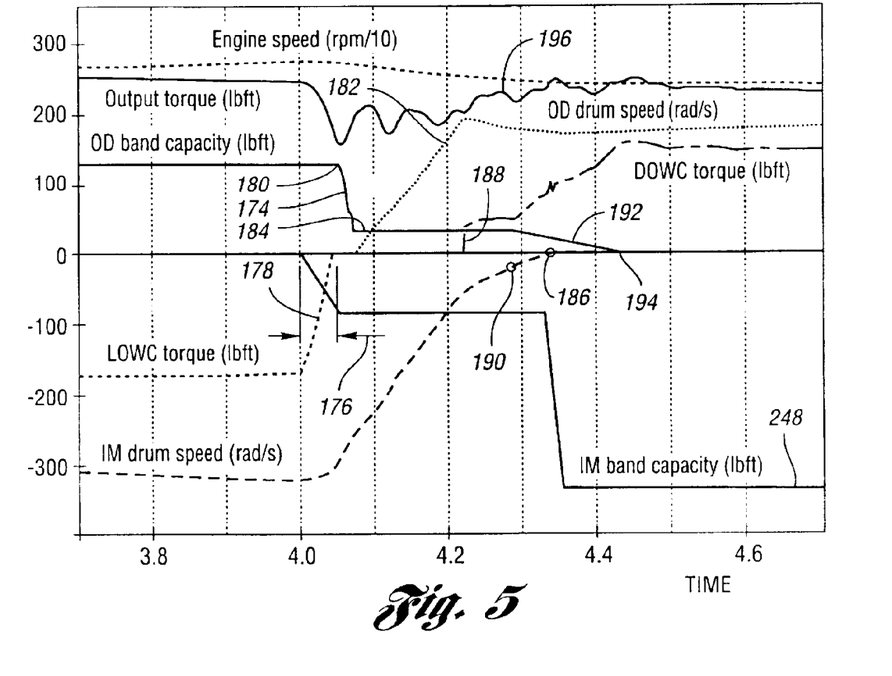
FIG. 5 is a plot of the characteristics shown in FIGS. 2, 3 and 4, but which demonstrate the timing of the brake application and release and the corresponding gear element speeds during a shift interval at low throttle for a transmission controlled in accordance with the teachings of the present invention.

FIG. 5 illustrates the performance resulting from the strategy of the present invention when the engine is at low throttle setting. The overdrive brake capacity decreases at the beginning of the overdrive brake release, as shown at 174 in FIG. 5. This follows a completion of the torque phase of the intermediate brake engagement, which is shown at 176, where the overrunning coupling torque for LOWC decreases, as shown at 178. The decrease in the overdrive brake capacity begins at 180 after the torque phase 176 is ended. Precise control of the overdrive brake release is not critical since it is the intermediate brake that has the primary effect on the output torque because of its proximity of the output shaft.

The strategy evaluates the overrunning speed of the overrunning coupling DOWC or the overdrive brake drum speed at 182 and adjusts the overdrive torque capacity shown at 184 so that the overrunning speed of the coupling DOWC approaches zero before the intermediate brake completes its engagement at 186. The timing when the overdrive brake drum achieves its peak corresponds to zero overrunning speed of the clutch DOWC. A partial torque transfer will occur from the overdrive brake to the overrunning coupling DOWC, as shown at 188, when the overrunning speed of coupling DOWC becomes zero. Then, when the intermediate brake drum speed reaches a small target value (for example, 30 radians/sec.) as shown at 190, the strategy commands a final reduction of overdrive brake torque capacity over an extended period of about 150 ms, as shown at 192. This period for the overdrive brake capacity reduction should be long enough to extend beyond the point 186, where the intermediate brake engagement is complete. It is possible to monitor the intermediate drum speed to ensure that point 186 occurs prior to completion of the overdrive brake capacity reduction, as shown at 194.

The output shaft torque remains relatively stable, as shown at 196, in comparison to the output shaft torque indicated in FIGS. 3 and 4. This stability in the output shaft torque is achieved, as previously described, without precisely matching the overdrive brake release and the intermediate brake engagement timings.

Figure 6:
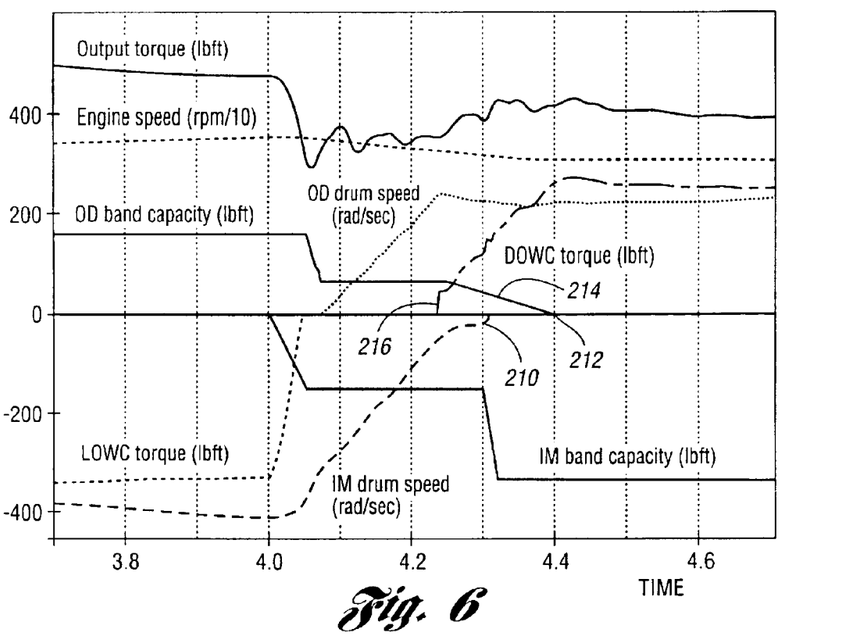
FIG. 6 is a plot corresponding to FIG. 5 when the engine is at medium throttle.

FIG. 6 is a plot similar to the plot of FIG. 5, although the data indicated in FIG. 6 represents a medium engine throttle shift rather than a low engine throttle shift. The intermediate brake drum speed in FIG. 6 reaches zero, as shown at 210, in advance of the zero point for the overdrive brake capacity, as shown at 212. This is due to the extended overdrive brake capacity reduction timing, as shown at 214. It is due also to the initiation of partial torque transfer from the overdrive brake to overrunning coupling DOWC, as the overrunning coupling DOWC ceases to overrun, as shown at 216.

Figure 7A:
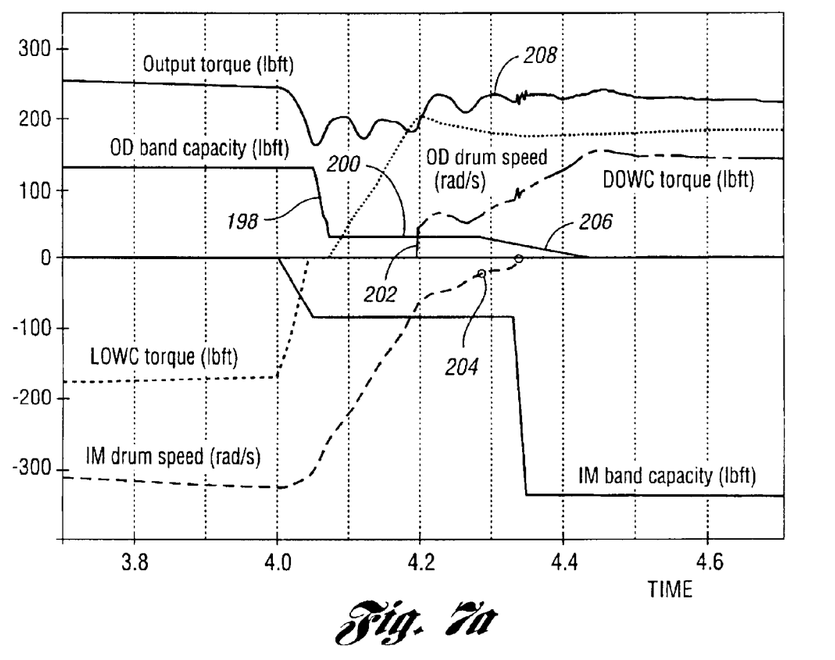
FIG. 7a is a plot showing the same characteristics as the plot of FIG. 5 when the overdrive brake capacity is lower, as evidenced by the increased slope of the overdrive drum speed plot.

FIGS. 7a–7e show system shift simulations at low engine throttle. These figures demonstrate the robustness of the strategy of the present invention with respect to variations in overdrive brake torque capacity level, the final release timing and the release interval. In the case of FIG. 7a, it is assumed, for purposes of illustration, that after the initial release of the overdrive brake at 198, the torque capacity level at 200 unexpectedly drops lower than the corresponding brake capacity level shown in FIG. 5. As a result, the overrunning speed of the overrunning coupling DOWC reaches zero and starts transmitting torque at an earlier time, as shown at 202. When the intermediate brake drum speed reaches 30 radians/sec. at point 204, a final release of the overdrive brake takes place over a period of 150 ms, as shown at 206. The strategy will result in an absence of significant torque disturbance at the output shaft, as shown at 208.

Figure 7B:
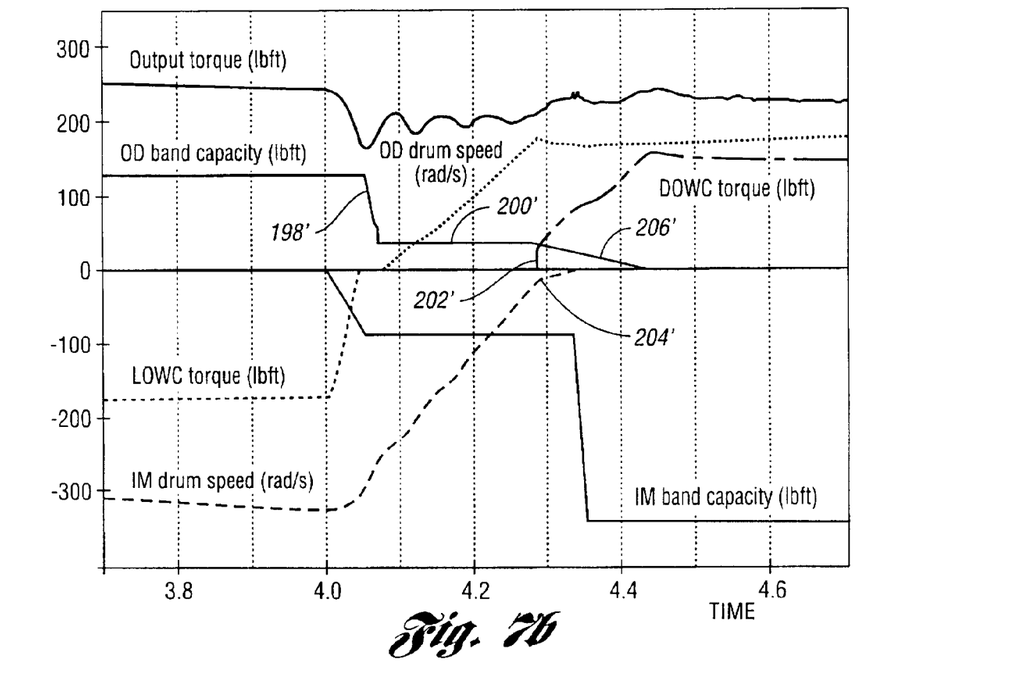
FIG. 7b is a plot similar to FIG. 5 when the overdrive brake capacity is increased.

In the case of FIG. 7b, after the initial release of the overdrive brake at 198', its torque capacity level will be assumed to stay unexpectedly higher than the corresponding level shown in FIG. 5. As a result, the overrunning speed of the overrunning coupling DOWC reaches zero and starts transmitting torque at a later time, as shown at 202'. When the intermediate brake drum speed reaches 30 radians/sec. at 204', shortly after the overrunning coupling DOWC starts transmitting torque at 202', a final release of the overdrive brake takes place over an extended period (150 ms, as shown 206'). The strategy of the present invention does not lead to any significant torque disturbance at the output shaft, as evidenced by the output torque shaft plot.

Figure 7C:
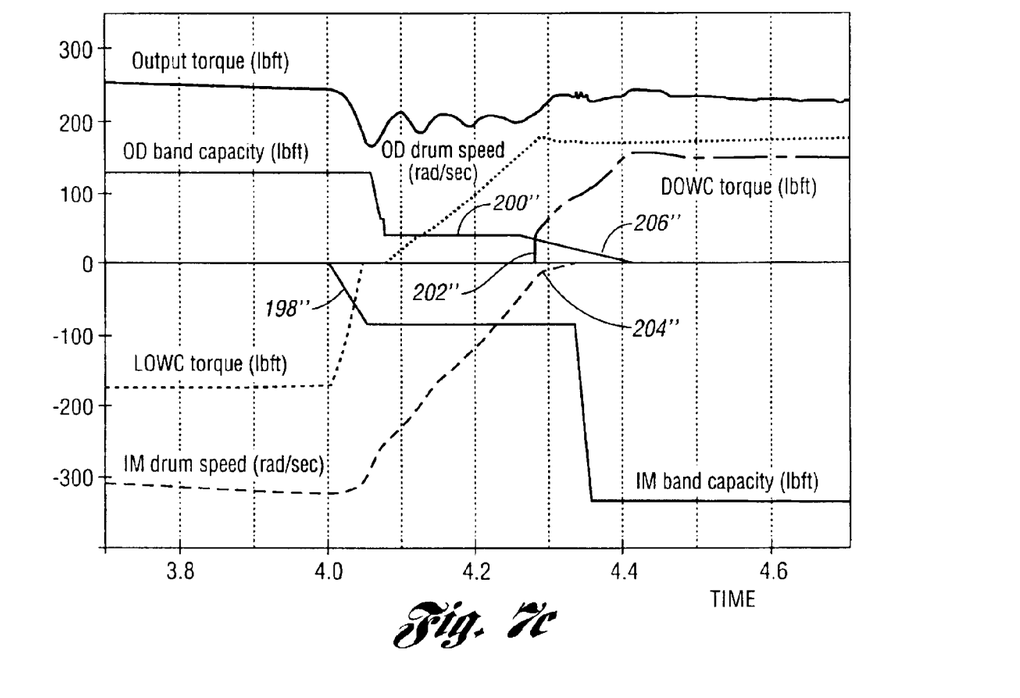
FIG. 7c is a plot similar to FIG. 7b when the overdrive brake release timing relative to intermediate brake release is at 50 radians/sec.

In FIG. 7c, the shift simulation is similar to that shown in FIG. 7b except that the final phase of the overdrive brake release takes place when the intermediate drum speed reaches 50 radians per second, as shown at 204". However, the output torque profile is still very similar to that shown in FIG. 7b. Again, there are no significant output torque disturbances comparable to the torque peak 166 in FIG. 3, nor to the so-called torque valley shown at 172 in FIG. 4.

Figure 7D:
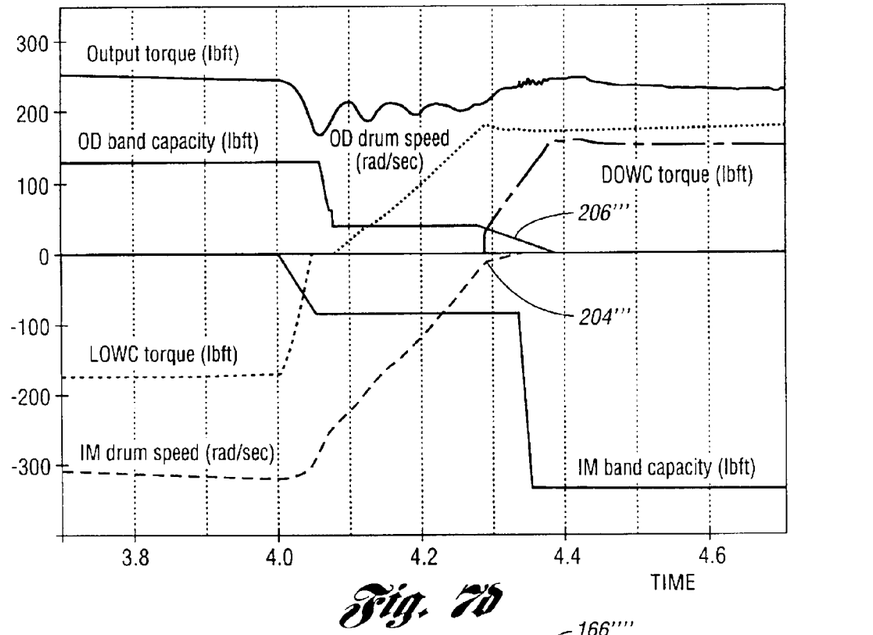
FIG. 7d is a plot similar to FIG. 7b when the final overdrive brake release interval is 100 ms.

The shift simulation shown in FIG. 7d is similar to that shown in FIG. 7b except that the final release of the overdrive brake takes place over 100 ms, as shown at 206''' instead of 150 ms, as shown at 206'. Notwithstanding this difference in the overdrive brake capacity release time, the output torque profile is still similar to that shown in FIG. 7b.

Figure 7E:
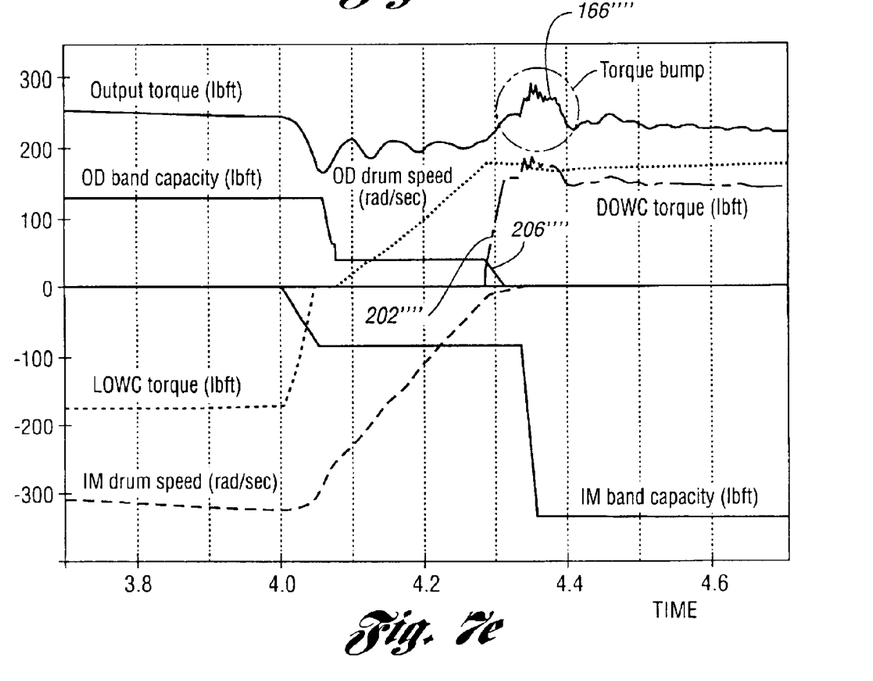
FIG. 7e is a plot similar to FIG. 7b when the final overdrive brake release time is reduced to 25 ms.

In FIG. 7e, the final overdrive brake release interval is further reduced to 25 ms, as shown at 206"". This release interval is close to that of the conventional strategy, as shown in FIG. 2. As a result, the overrunning coupling DOWC torque rapidly increases, as shown at 202"", which causes an undesirable torque bump 166"" comparable to the disturbance 166 in FIG. 2.

These FIGS. 7a–7e illustrate that it is critical to gradually reduce the overdrive brake torque capacity at the end of the shift.

Figure 8:
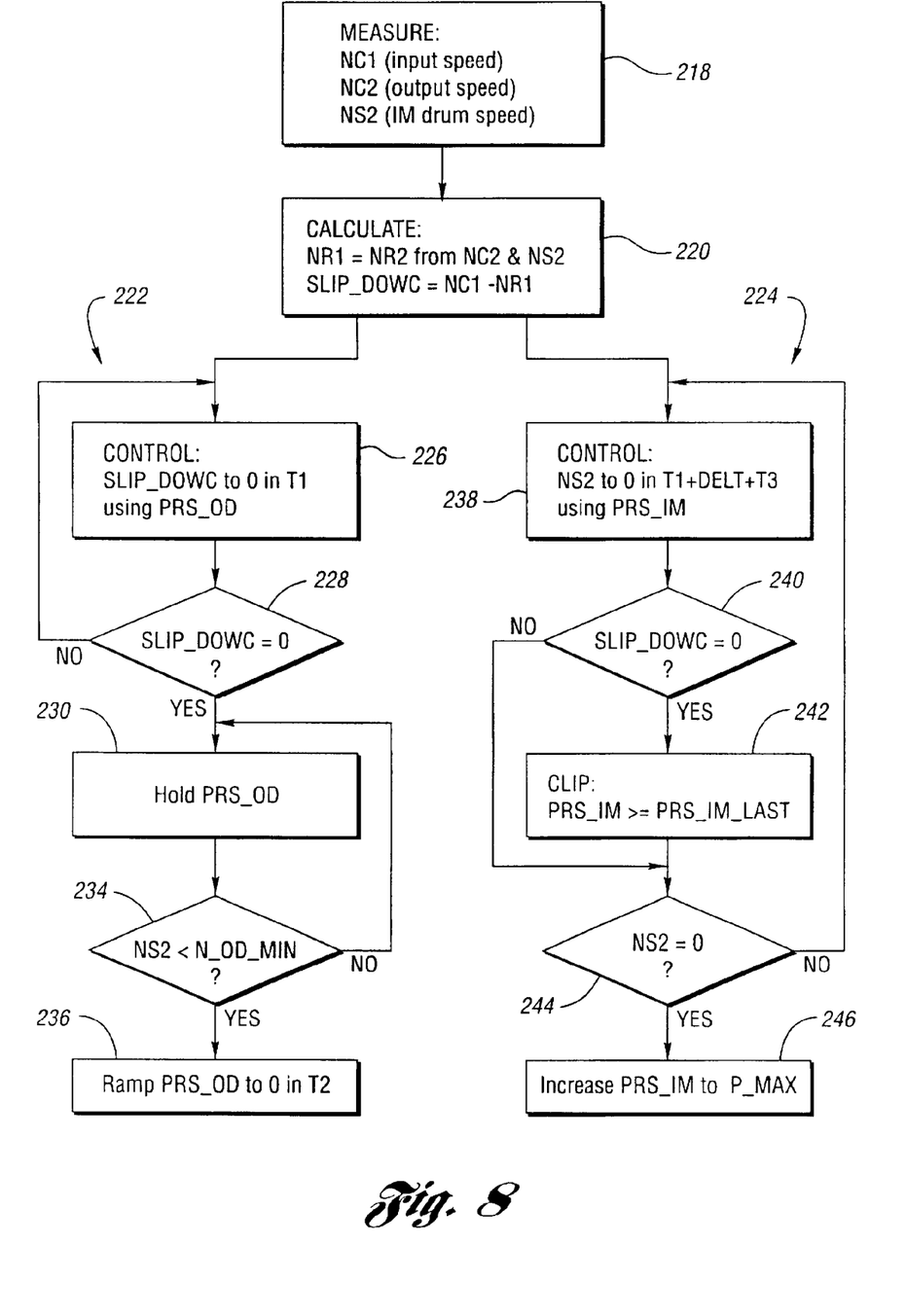
FIG. 8 is a flowchart illustrating the control strategy employed in practicing the invention.

FIG. 8 shows in flow diagram form the method steps used in carrying out the strategy of the present invention. Three speed measurements are needed in carrying out the strategy. These are the input speed NC1, output speed NC2, and intermediate drum speed NS2, as shown in action block 218. These speeds, which are identified in FIGS. 1 and 1a, are continuously monitored. The values are distributed to the input signal conditioning portion of the microcomputer 18. Sample readings are taken in each background control loop of the microcomputer and stored in RAM portions of memory. The central processor unit (CPU) in the digital microcomputer 18 calculates the speed of the ring gear 90 (NR1). Since the forward clutch 92 is engaged, NR1=NR2, which is the speed of the ring gear 94. The overrunning speed of the overrunning coupling DOWC is calculated as the difference between NC1 and NR1. These calculations occur at action block 220.

The ring gear speed NR2 is computed using the known planetary gear constants of the Simpson gearset. The values NC2 and NS2 are measured and the value NR2 is calculated. Since ring gear 90 rotates with ring gear 94, the slip, or overrunning speed, across the first planetary gearset coupling DOWC (SLIP_DOWC) can be determined.

Figure 9A:
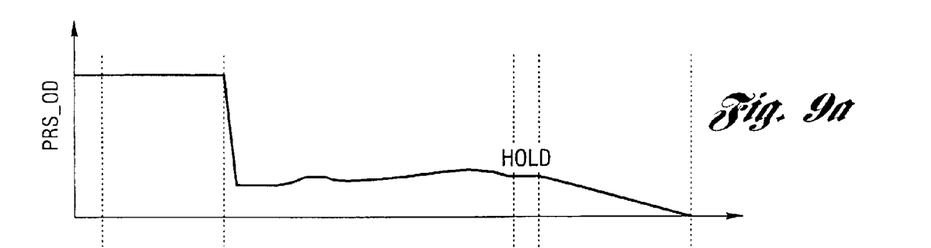
FIGS. 9a, 9b, 9c and 9d are plots illustrating the timing of overdrive brake servo pressure, the overrunning coupling speed for the first gear unit, the intermediate brake servo pressure, and the reaction gear speed, respectively, for the swap-shift transmission controls of the present invention.
Figure 9B:
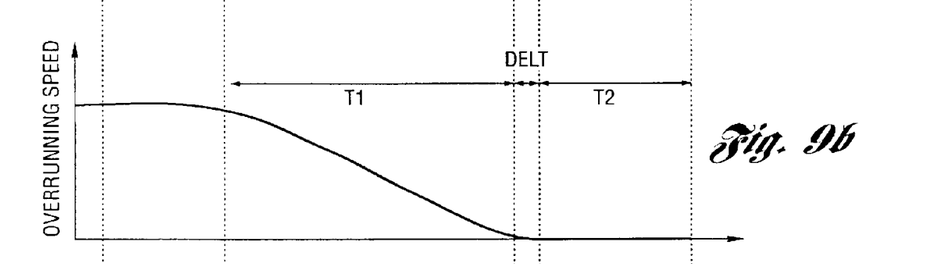

After filling and stroking the intermediate brake pressure servo, two simultaneously executed control loops are activated, as shown at 222 and 224. Control loop 222 drives down to zero the overrunning coupling speed SLIP_DOWC until it reaches zero at a fixed time T1 seconds using the overdrive servo pressure as a variable. This is done in action block 226. Simultaneously, control loop 224 begins by driving down the value NS2 to zero in a time interval of T1 plus DELT plus T3 seconds. This is indicated in the plot of FIG. 9d, where the sun gear speed NS2 is plotted against time during the shift interval.

Each control loop may be a conventional proportional-integral-derivative (PID) control with speed error as a feedback and a linear ramp to zero for a set point. The ramp rates for the speed set points are calculated at the beginning of the shift.

When the first control loop 222 has brought the value for SLIP_DOWC to zero, it is checked at decision block 228. The pressure on the overdrive servo is held at a value of PRS_OD, as shown at action block 230. The value for PRS_OD is the last value until NS2 becomes less than the value N_ODMIN. It is tested at 234. At that time, PRS_OD is ramped down to zero, as shown at 236.

The second control loop at 224 will continue the control of intermediate brake servo pressure until NS2 becomes zero. The engagement of the intermediate brake is completed in time T1+DELT+D3, as shown in FIG. 9d. This occurs at action block 238.

When the value SLIP_DOWC in the first control loop 222 reaches zero, it will not allow the pressure on the intermediate brake servo to decrease. It is only possible to increase the intermediate brake servo pressure. This is achieved by clipping the intermediate brake servo pressure PRS_IM to the greater of the new control loop value or the value last sent to the variable force solenoid of FIG. 1c, which controls servo pressure.

The decision block 240 in FIG. 8 determines when the overrunning coupling speed DOWC reaches zero, which is seen at 188 in FIG. 5. The action block at which the intermediate servo pressure is clipped is indicated in FIG. 8 at 242. This clipped value for PRS_IM is shown in FIG. 9c.

When the second control loop 224 makes NS2=0, the capacity on the intermediate servo is increased to a maximum. This is represented in FIG. 8 by decision block 244 and action block 246. The capacity on the intermediate brake servo then is increased to its maximum value. At this point, the shift is complete. When the first control loop finishes its ramp of the overdrive brake servo pressure to a zero value in T2 seconds, as shown at action block 236, the maximum intermediate brake capacity is shown in FIG. 5 at 248.

FIGS. 9a through 9d show the definitions for the times T1, DELT, T2 and T3, and the relationship between these times and the two control loops 222 and 224. Each control loop is used to drive their respective speeds to zero. Thus, the ramp rates for the set points can be determined as the initial value of speed divided by the desired time. The ramp rates can be determined if a normalized percent shift complete indicator for each control loop is used. This is done by computing a value equal to 1 minus current speed divided by the speed at the start of the shift. In the alternative, the ramp can be achieved by implementing an open loop fixed value substitute for the intermediate servo pressure PRS_IM rather than having the second control loop act on sun gear speed NS2. In this alternative implementation, the value of PRS_IM can be adaptively determined by measuring T3 and adjusting intermediate servo pressure so that T3 is less than T2, seen in FIG. 9b, and time value T3 is greater than zero (see FIG. 9d).

Figure 9C:
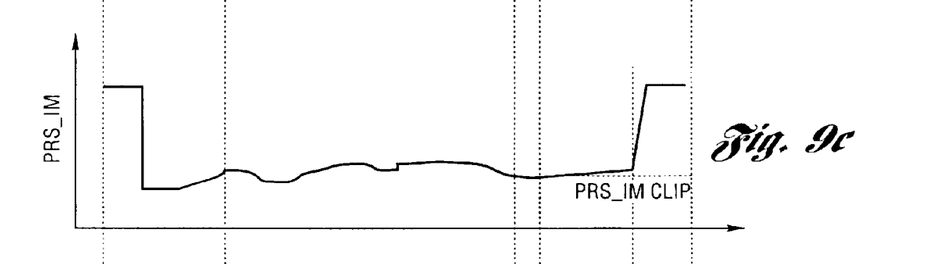
Figure 9D:
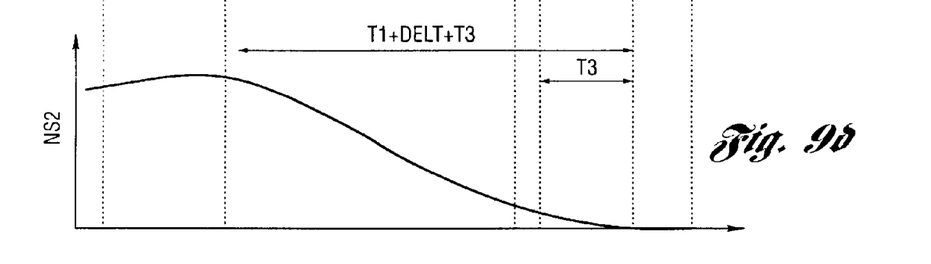

FIG. 9c shows a variation in the intermediate servo pressure during the shift interval together with the clipped value for intermediate servo pressure. FIG. 9a shows the variations in overdrive servo pressure during the shift interval.

In an alternative implementation of the strategy, the intermediate servo pressure may be adaptively determined. The intermediate servo pressure can be adjusted, as explained previously, because the shift quality is determined using the strategy of the present invention. It is relatively insensitive to variations in the value T3.

4. Summary

The present invention avoids the inertia torque disturbance, as shown at 166 in FIG. 3 and at 172 in FIG. 4. The disturbance at 146 in FIG. 2 is due to the fast rise in the overrunning clutch torque or coupling DOWC at 148.

If the overdrive brake is released early, as shown at 156 in FIG. 3, that increases the size of the peak torque disturbance shown at 166 due to a combination of a rapid torque increase in DOWC and increased intermediate brake capacity.

In FIG. 4, if the intermediate brake drum speed goes to zero, while the overdrive brake capacity has not yet started to go to zero, as shown at 168 and 170 in FIG. 4, a torque disturbance in a negative direction is created at 172 in FIG. 4.

In FIG. 5, it is demonstrated that applicants' strategy does not require a match between the overdrive brake release with the intermediate brake drum capacity increase. The torque on the overrunning coupling LOWC, shown at 178, goes to zero, and only after that happens does the overdrive brake capacity decrease, as shown at 180. The overdrive brake capacity decreases to the level at 184 in FIG. 5, at which time the overdrive drum speed begins to slip, but the overdrive brake is not released. The overdrive drum speed increases to its peak value, as shown at 182.

The value for the overdrive brake capacity at 184 in FIG. 5 is less than the overdrive brake capacity value at 138 in FIG. 2 so that the overdrive drum speed rises faster to its peak as shown at 182. The overrunning coupling DOWC at that instant starts transmitting torque, as shown at 188. The rise in the curve at 188 is less compared to the rise at 148 in the case of the prior art design of FIG. 2.

At point 190 in FIG. 5, the overdrive brake capacity begins to fall, as shown at 192, over a non-critical time until point 194 is reached. This is what causes the torque on coupling DOWC to rise at a lower slope in the case of the design indicated in FIG. 5 compared to the prior art designs of FIGS. 3 and 4. The intermediate brake drum speed slows down to zero, as shown at 186 in FIG. 5, before the overdrive brake capacity reaches zero at point 194.

The peak for overdrive drum speed at 182 must be reached before the intermediate drum speed reaches zero at point 186 in FIG. 5. The overdrive brake capacity at 184 must be small enough to allow that to happen.

When point 190 is reached, the gradual release of the overdrive brake is triggered, as shown at 192. That must give enough time for the intermediate drum speed to reach zero before point 194 is reached.

In the case of the shift demonstrated in FIG. 7b, as in the case of the shift demonstrated in FIG. 5, the torque on the overrunning coupling DOWC must start increasing before the intermediate drum speed reaches zero. Then, overdrive brake capacity must be brought to zero over an extended time in order to minimize torque disturbance caused by the overrunning coupling DOWC. Aside from these requirements, there is no need to match the overdrive brake capacity release and the intermediate brake engagement, as in the case of the strategy demonstrated in FIG. 2.

The strategy of the present invention does not require precise synchronization of the friction element engagement and release times. It achieves minimum output shaft inertia torque disturbances and has reduced shift sensitivity, regardless of varying operating conditions or unit-to-unit hardware variations, or friction element or other hardware degradation over extended use. It also simplifies transmission calibration and calibration time.

Having described an embodiment of the invention, it will be apparent that modifications may be made by persons skilled in the art without departing from the scope of the invention. All such modifications and equivalents thereof are intended to be covered by the following claims.

What is claimed is:

1. A transmission ratio shift control method for a swap-shift transmission in a powertrain for an automotive vehicle including an engine and two multiple-ratio gear units, a torque input element of a first of the gear units being connected drivably to the engine, a torque output element of the first gear unit being connected to a torque input element of the second gear unit, an overrunning coupling connecting the torque input element to the torque output element of the first gear unit, a torque output element of the second gear unit being connected to a driven torque output shaft, each gear unit having a reaction member including a pressure-actuated reaction brake means for effecting ratio changes, one reaction brake being applied and the other reaction brake being released, whereby one gear unit is upshifted and the other gear unit is downshifted;

the method comprising the steps of:
measuring input speed of a torque transfer element of the first gear unit, the output speed of one element of the second gear unit and the speed of a second element of the second gear unit;
controlling overrunning speed of the overrunning coupling at the first gear unit during a ratio change interval as reaction brake capacity for the first gear unit is changed whereby a reaction member of the first gear unit becomes released in a first time increment during the ratio change interval;
controlling a speed ratio change rate at the second gear unit during the ratio change interval as the reaction brake for the second gear unit is applied whereby the reaction member for the second gear unit becomes braked in a second time increment during the ratio change interval;
the reaction brake for the second gear unit becoming fully applied before the reaction brake for the first gear unit is fully released whereby inertia torque disturbances at the output shaft are reduced.

2. A transmission ratio shift control method as set forth in claim 1 wherein the step of controlling overrunning speed of the overrunning coupling at the first gear unit is carried out simultaneously with the step of controlling speed ratio change rate for the second gear unit.

3. A transmission ratio shift control method for a swap-shift transmission in a powertrain for an automotive vehicle including an engine and two multiple-ratio gear units, a torque input element of a first of the gear units being connected drivably to the engine, a torque output element of the first gear unit being connected to a torque input element of the second gear unit, an overrunning coupling connecting the torque output element and the torque input element of the first gear unit, a torque output element of the second gear unit being connected to a driven toque output shaft, each gear unit having a reaction member including a pressure-actuated reaction brake means for effecting ratio changes as one reaction brake means is applied and the other reaction brake means is released, whereby one gear unit is upshifted and the other gear unit is downshifted;

the method comprising the steps of:
measuring input speed of the first gear unit, the speed of the torque input element of the second gear unit and the speed of the reaction member of the second gear unit; controlling overrunning speed of the overrunning coupling during a shift interval whereby overrunning coupling speed for the first gear unit becomes zero in a first calibrated time increment during a ratio change interval;
controlling speed of the reaction member of the second gear unit over a second calibrated time movement whereby inertia torque disturbances at the driven torque output shaft are reduced as the reaction brake means for the second gear unit is applied before the reaction brake for the first gear unit is fully released.

4. The transmission ratio shift control method set forth in claim 3 wherein the step of controlling speed ratio change rate at the first gear unit is carried out simultaneously with the step of controlling speed ratio change rate for the second gear unit.

5. A transmission ratio shift control method for a swap-shift transmission in a powertrain for an automotive vehicle including an engine, the transmission having a first simple planetary gear unit with a first carrier connected to the engine, a first ring gear and a first sun gear, a second multiple-ratio gear unit with second and third ring gears, a second carrier connected, a third ring gear connected to a driven member, and a second sun gear, the first ring gear being drivably connected to the second ring gear, an overrunning coupling connecting the first carrier to the first ring gear, a first pressure-actuated reaction brake for the sun gear of the first gear unit, a second pressure-actuated reaction brake for the second sun gear;

the method comprising the steps of:
measuring the speed of the first carrier for the first gear unit, the speed of the second carrier for the second gear unit and the speed of second sun gear for the second gear unit;
controlling the overrunning speed of the overrunning coupling during a shift interval whereby reaction torque on the first sun gear becomes zero in a first time increment during a ratio change interval;
controlling the speed of the sun gear of the second gear unit during a second time increment whereby the second reaction brake becomes fully applied before the first reaction brake is fully released.

6. The transmission ratio shift control set forth in claim 3 wherein the step of controlling the overrunning coupling speed comprises effecting partial torque transfer from the reaction brake means for the first of the gear units to the overrunning coupling before the reaction brake means for the second gear unit causes the reaction member speed for the second gear unit reaches a low target speed approaching zero speed.

7. The transmission ratio shift control method set forth in claim 5 wherein the step of controlling the overrunning speed of the overrunning coupling comprises effecting partial torque transfer from the first reaction brake to the overrunning coupling before the second reaction brake causes the second sun gear speed to reach a low target speed approaching zero speed.

8. The transmission ratio shift control method set forth in claim 6 wherein the step of controlling overrunning coupling speed comprises closed-loop control of actuating pressure for the reaction brake means for the first of the gear units.

9. The transmission ratio shift control method set forth in claim 7 wherein the step of controlling the overrunning speed of the overrunning coupling comprises closed-loop control of actuating pressure for the first reaction brake for the first gear unit.

10. The transmission ratio shift control method set forth in claim 6 wherein the steps of controlling speed ratio change at the second gear unit comprises closed-loop control of actuating pressure for the reaction brake for the second gear unit.

11. The transmission ratio shift control method set forth in claim 7 wherein the step of controlling the speed of the sun gear of the second gear unit comprises closed-loop control of actuating pressure for the reaction brake for the second sun gear.

* * * * *